US006567510B1

United States Patent
Brugman et al.

(10) Patent No.: US 6,567,510 B1
(45) Date of Patent: May 20, 2003

(54) TRAFFIC MONITOR FOR DETECTING TRUNK TRAFFIC CONGESTION IN A TELEPHONE SWITCHING NETWORK

(75) Inventors: David LeRoy Brugman, San Clemente, CA (US); Donald Ray Smiley, Naperville, IL (US); David Louis Spaay, Oswego, IL (US); Nelson Tom, Plainsboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 164 days.

(21) Appl. No.: 09/624,328

(22) Filed: Jul. 24, 2000

(51) Int. Cl.[7] .............................................. H04M 15/00
(52) U.S. Cl. ............ 379/137; 379/112.01; 379/112.06; 379/112.08; 379/112.1; 379/133; 379/134
(58) Field of Search ..................... 379/112.01, 112.03, 379/112.04, 112.05, 112.06, 112.08, 112.1, 114.13, 133, 134, 137, 220.01, 221.03, 243; 370/229, 389

(56) References Cited

U.S. PATENT DOCUMENTS

| | | | |
|---|---|---|---|
| 5,410,589 A | * | 4/1995 | Galligan ..................... 379/134 |
| 5,881,140 A | * | 3/1999 | Gerault et al. ............... 379/137 |
| 5,903,635 A | * | 5/1999 | Kaplan ........................ 379/133 |
| 6,011,838 A | * | 1/2000 | Cox ........................ 379/112.01 |
| 6,078,647 A | * | 6/2000 | D'Eletto ..................... 379/133 |
| 6,282,267 B1 | * | 8/2001 | Nolting ....................... 379/133 |
| 6,327,361 B1 | * | 12/2001 | Harshavardhana et al. . 379/230 |
| 6,330,313 B1 | * | 12/2001 | Hunt .......................... 379/133 |
| 6,389,112 B1 | * | 5/2002 | Stewart et al. ........... 379/29.09 |

* cited by examiner

Primary Examiner—Sinh Tran
Assistant Examiner—Quoc Tran

(57) ABSTRACT

A traffic monitor listens passively on the data link used to communicate among switching systems for setting up telephone calls for call setup messages and checks the call setup messages for destination telephone number. If it determines that the destination telephone number is for an Internet service provider (ISP), the system reports the point code of the originating office. By analyzing the output of the traffic monitor according to this invention, local exchange carrier (LEC) may reconfigure its network to remove feature rich switches from the ISP call delivery network and replace them with a small tandem-like switch.

2 Claims, 4 Drawing Sheets

TRAFFIC MONITOR FOR DETECTING TRUNK TRAFFIC CONGESTION IN A TELEPHONE SWITCHING NETWORK

FIELD OF THE INVENTION

This invention relates to the area of telephone switching networks and, more specifically, to a system and method for detecting traffic congestion on network trunks caused by, for example, Internet service provider connections to local switching systems.

BACKGROUND OF THE INVENTION

Home and business data communication has expanded exponentially in recent years. Most businesses and many homes have at least one computer equipped to communicate electronically (i.e., via the Internet, private data network, etc.). Some large businesses (and even some homes) are connected to the data network directly. However, most home applications and small businesses are connected to the data network by some form of Internet service provider (ISP). For each such data connection, there is a modem at the customer's PC connected to a modem at the Internet service provider's data access center. Thus, the first leg of the data connect, the leg between the computer and the ISP, is through the existing wireline telephone network.

Data access through the telephone network may take one of two forms either through a modem (which is currently at 53 kbps maximum) or through integrated services digital network (ISDN) (which is approximately 128 kbps). For each connection to an Internet service provider, a telephone call is placed from the user's telephone line to the switch on which the user is based, and then through the telephone network to the switch connected to the Internet service provider. Finally the call is delivered to a modem pool at the Internet service provider equipment via trunks.

Local exchange carriers (local telephone companies) in the past have been purchasing switches and provisioning their networks for feature rich voice service. Each switch includes services and features that provide added sources of revenue for the service providers but also cost more than a basic switching system. These switches, however, are being used to connect to ISPs, and these lines are being held longer than ever before. A typical telephone call in the past was approximately two minutes. These days, it is not unusual to have a multi-hour connection. It would greatly benefit the local service providers to connect these data calls through equipment that is not feature rich and save feature rich equipment for telephone service for which they were originally intended. However, there is no current system or method for differentiating between a plain old telephone call and a data call to an ISP, and thus no satisfactory method for the LEC to determine economically rational trunking (inter-office connections).

SUMMARY OF THE INVENTION

This problem is solved and a technical advance is achieved in the art by a system and method for operating the system that may be connected to a switching system that supports an ISP connection to determine the originating switch of calls to the ISP. The system listens passively on the data link that the signaling network uses to set up telephone calls. The monitor checks call setup messages for destination telephone numbers. If it determines that the destination telephone number is for an ISP, the system reports the point code of the originating office (also found in the call setup message).

By analyzing the output of the traffic monitor according to this invention, a local exchange carrier (LEC) may reconfigure its network to remove feature rich switches from the ISP call delivery network and replace them with a small, tandem-like switch.

BRIEF DESCRIPTION OF THE DRAWINGS

A more complete understanding of the invention may be obtained from consideration of the following description taken in conjunction with the drawings in which.

DETAILED DESCRIPTION

Figure 1:
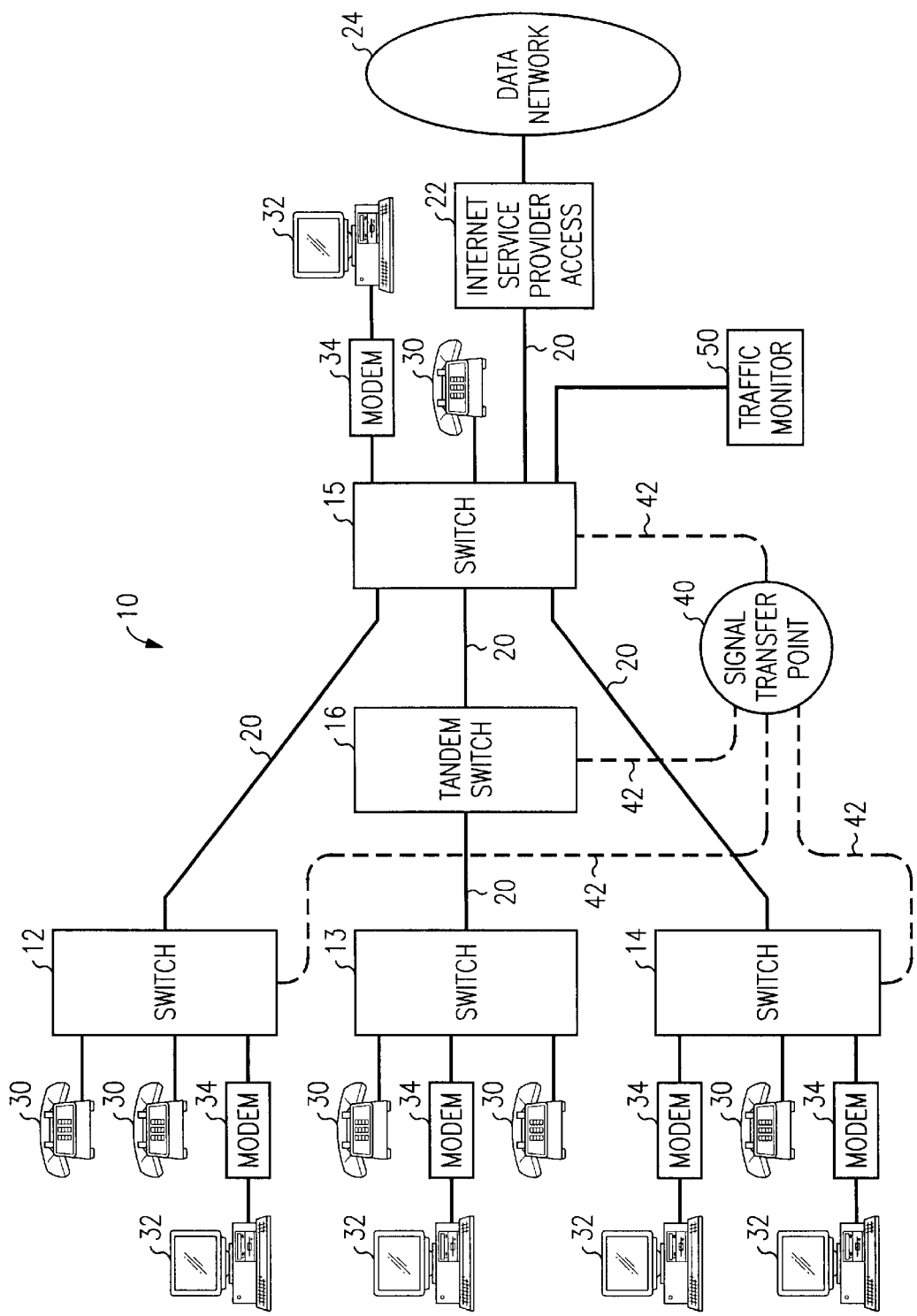
FIG. 1 is a block diagram of a current local exchange carrier network in which a traffic monitor according to an exemplary embodiment of this invention may be used.

FIG. 1 is a block diagram of a typical local exchange carrier (LEC) system 10 serving a community. In this local network 10, there are a plurality of switches of local switching systems represented by switches 12, 13, 14 and 15. A tandem switch 16 is also present. As is known in the art, tandem switch 16 acts as a hub in a switching network to interconnects other switches to each other and to for example, one of the plurality of long distance networks (not shown, but well known in the art). Switches and tandem switch 12–16 are interconnected via trunks 20. Trunks may comprise, for example, one or more T1 connections. The full interconnection of switches 12–16 are not shown but is well known in the art. In this exemplary embodiment, switch 15 is connected via one or more trunks 20 to an Internet service provider access point 22. Internet service provider access provides a plurality of modems in communication with modems in the network that prepare the data for connection to the data network 24. Data network 24 may comprise, for example, the Internet or a private data network as is known in the art.

Each switch 12–15 is connected to a plurality of telephones represented by telephones 30. Each telephone 30 has its own set of features according to the needs of the user. For example, if the user is a business, it may have features such as voice mail, caller ID, call forwarding, multiline hunt group, etc. Also connected to switches 12–15 are a plurality of PCs 32. Each PC is connected to switch 12–15 by way of a modem 34 as is known in the art.

Each switch is connected to a signaling network, which includes signal transfer point 40, via a separate signaling line 42. Signaling network and signaling transfer point 40 facilitate the communication of switches among each other in order to, for example, set up and tear down telephone calls.

A typical data connection starts with an EPC 32 causing its modem 34 to dial the directory number one of the plurality of directory numbers of Internet service provider access 22. An origination message is sent over one of the signaling at work connections 40 to signal transfer point 40 which then sends a message to switch 15. Switch 15 determines that there is an open trunk 20 to by ISP access 22 and sends a message back through STP 40 to the originating switch. A connection is then made between the switch (or tandem) and switch 15 via trunk and then a trunk connection is also made between switch 15 and ISP 20.

As stated above, switch 15 is a feature-rich switch such as a 5ESS® switch manufactured by Lucent Technologies, the assignee of this invention. Each trunk 20 connected between switch 15 and Internet access service provider 22 is a system resource that is not available for other, more lucrative use. Each trunk 20 between switch 15 and ISP 22 is more expensive because of the lack of use of the resources available in switch 15 and the length of time that a typical data call over trunks 20 between switch 15 and ISP 22 will last.

Figure 2:
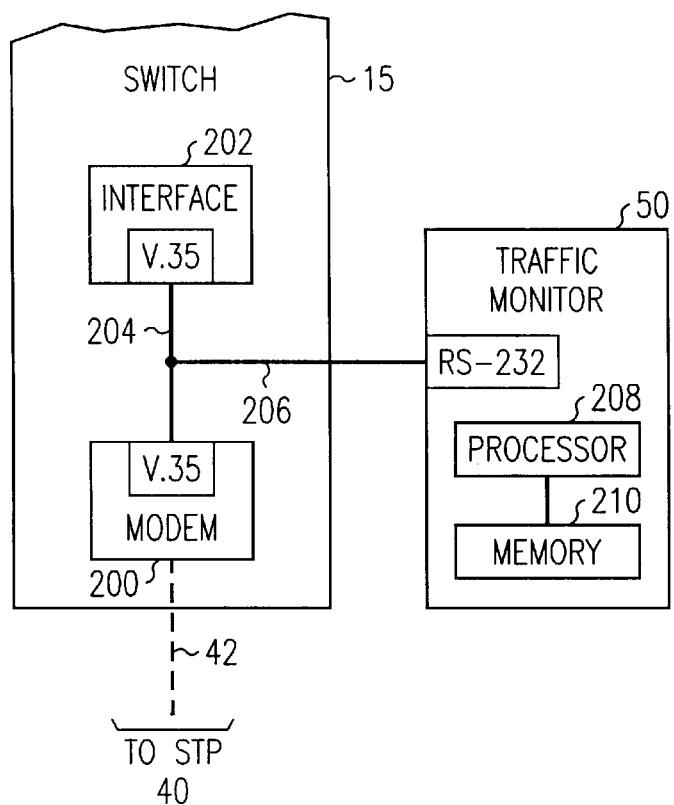
FIG. 2 is a block diagram of the connection of the traffic monitor into a switch of FIG. 1.

Therefore, according to this invention, a traffic monitor 50 as will be described more fully in connection with FIG. 2, is connected to switch 15 along signaling path 42 in order to intercept signaling messages. In general, traffic monitor 50 is passively connected to a signaling path to monitor signaling messages, specifically signaling messages to switch 15. Traffic monitor 50 monitors call origination messages and listens for ("traps on") messages that contain a dialed number corresponding to one or more ISP access numbers. When an ISP access number is identified, the source office point code is recorded. The system is considered passive in that it just monitors the connection without invasively affecting call setup time.

Turning now to FIG. 2, a block diagram of the connection of traffic monitor 50 to switch 15 is shown. In switch 15, a modem 200 is connected via a line 42 to STP 40. Modem 200 uses V.35 protocol to communicate to an interface 202 to the switch also using V.35 protocol.

The modem 200 in interface 202 is connected via bus 204. Bus 204 is tapped by bus 206. This tap may be, for example, a Y connector as is known in the art. Bus 206 is connected to traffic monitor 50 at an RS 232 port. Traffic monitor 50 may be a programmed personal computer or workstation. Traffic monitor 50 includes a processor 208 for executing instructions and processing data from memory 210.

Figure 3:
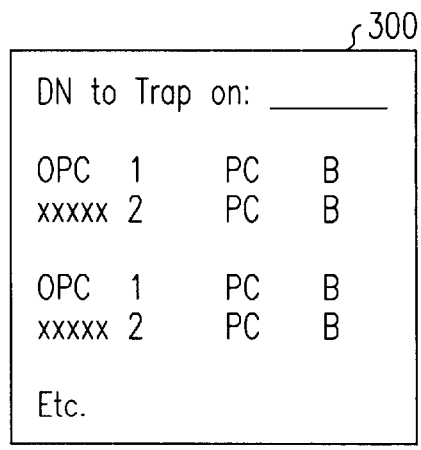
FIG. 3 is an example of a traffic monitor count from the traffic monitor of FIG. 2.

Turning now to FIG. 3, a typical record is shown. A directory number to trap on is entered into the traffic monitor 50 and into record 300. Each time an origination message is received for that DN the office point code (OPC) is noted and a peg count (PC) is incremented. If an office point code is not found in the list, then it is added, as will be discussed further, below.

Figure 4:
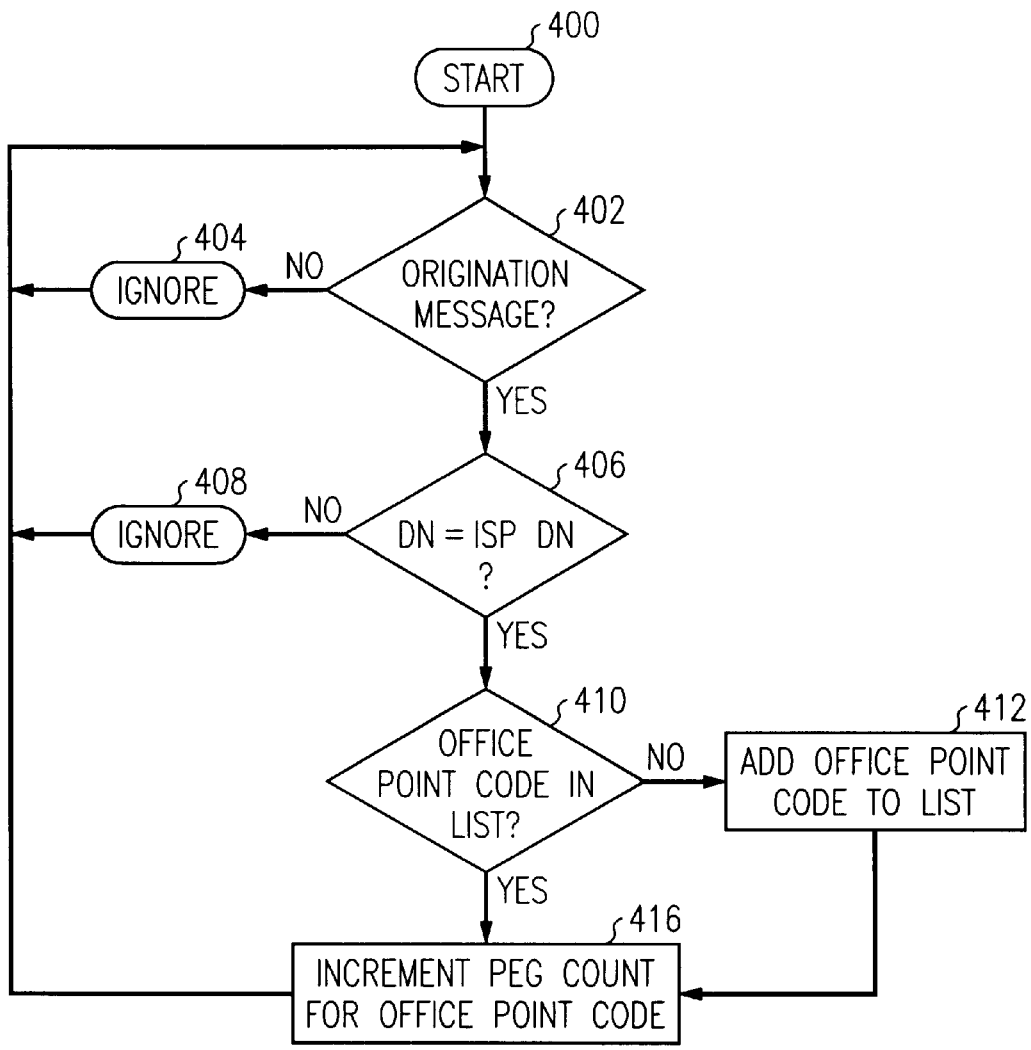
FIG. 4 is a flowchart of the operation of the traffic monitor according to this invention.

Turning now to FIG. 4, a flowchart of the operation of traffic monitor 15 is shown. Processing starts at oval 400 and proceeds to decision diamond 402. In decision diamond 402, a determination is made if an origination message has been received. If an origination message has not been received then the message is ignored in oval 400 and processing loops back to decision diamond 402.

If, in decision diamond 402, an origination message is received then in decision diamond 406 a determination is made if the directory number is equal to one of the ISP directory numbers that are to be trapped on. If the origination message directory number is not the same as an ISP directory number then processing proceeds to oval 408 where the message is ignored and processing loops back to decision diamond 402.

If, in decision diamond 406, the directory number is one that is of the ISP then processing proceeds to decision diamond 410 where a determination is made if the office point code is in the list. If the office point code is not in the list then processing proceeds to box 412 where the office point code is added to the list. Processing from both decision diamond 410 and action blocks 412 proceeds to action block 416 where the pay count is incremented for the office point code in the message. Processing then loops back to decision diamond 402.

Figure 5:
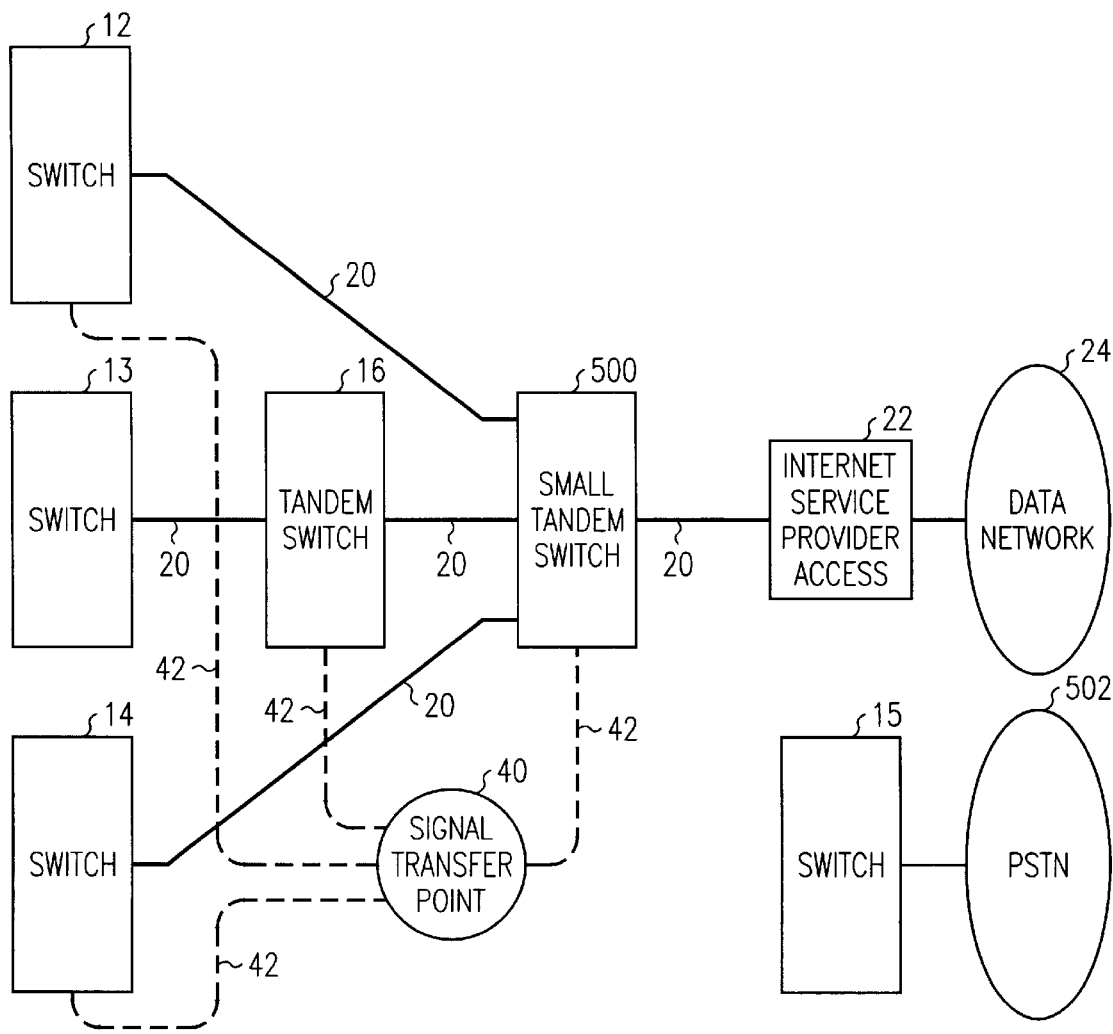
FIG. 5 is an exemplary reconnection of the network after analysis with the traffic monitor according to an exemplary embodiment of this invention.

Turning now to FIG. 5, a block diagram of the local telephone network wherein a traffic monitor according to an exemplary embodiment of this invention has been employed is shown. In this exemplary embodiment, the ISP 22 has been moved from switch 15 to a small tandem 500. Switches 12, 14 and tandem 16 (through which switch 13 communicates) have all be retrunked to small tandem 500. In this exemplary embodiment, small tandem is a 5ESS® switch equipped solely with trunk units. Switch 15 is connected to the public switched telephone network 500, as is known in the art. In this manner, the cost of a feature rich switch can be avoided lowering the per trunk cost for providing Internet service.

It is to be understood that the above-described embodiment is merely an illustrative principle of the invention and that many variations may be devised by those skilled in the art without departing from the scope of the invention. It is, therefore, intended that such variations be included within the scope of the claims.

What is claimed is:

1. A method for use in a traffic monitor comprising the steps of:

monitoring a signaling link for call origination messages;

determining if a call origination message contains a predetermined destination directory number;

determining a switching office point code responsive if said origination message contains said predetermined destination directory number;

determining whether said switching office point code is in a list of switching office point codes;

adding said switching office point code to said list responsive to determining that said switching office point code is not in said list; and if said switching office point code is in said list, incrementing a peg count associated with said switching office point code.

2. A method for use in a traffic monitor comprising the steps of:

monitoring a signaling link for call origination messages;

determining if a call origination message contains a predetermined destination directory number;

determining a switching office point code responsive if said origination message contains said predetermined destination directory number;

incrementing a peg count associated with said switching office point code in a list of switching office point codes;

analyzing said fist of switching office point codes to determine one or more switching offices that originate calls to said predetermined destination directory number regularly; and reconfiguring said telephone switching network responsive to said step of analyzing said list to remove one or more telephone switching systems from a call path between said switching offices and said predetermined destination telephone number.

* * * * *